US011195001B2

United States Patent
Suzuki et al.

(10) Patent No.: US 11,195,001 B2
(45) Date of Patent: Dec. 7, 2021

(54) BEHAVIOR MONITORING DEVICE, BEHAVIOR MONITORING SYSTEM, AND BEHAVIOR MONITORING PROGRAM

(71) Applicant: TOYOTA JIDOSHA KABUSHIKI KAISHA, Toyota (JP)

(72) Inventors: Koichi Suzuki, Miyoshi (JP); Ryo Kanda, Nisshin (JP); Daiki Kubo, Toyota (JP); Koichiro Mitsumaki, Nagoya (JP); Miku Ando, Miyoshi (JP); Shunji Tateishi, Kasugai (JP); Yoshitaka Masuda, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/664,349

(22) Filed: Oct. 25, 2019

(65) Prior Publication Data
US 2020/0184202 A1 Jun. 11, 2020

(30) Foreign Application Priority Data
Dec. 10, 2018 (JP) .............................. JP2018-231199

(51) Int. Cl.
*G06K 9/00* (2006.01)
*H04N 5/225* (2006.01)
(52) U.S. Cl.
CPC ..... *G06K 9/00335* (2013.01); *G06K 9/00362* (2013.01); *G06K 9/00791* (2013.01); *H04N 5/2253* (2013.01)

(58) Field of Classification Search
CPC .......... G06K 9/00335; G06K 9/00362; G06K 9/00791; H04N 5/2253
USPC .......................................... 348/148; 382/103
See application file for complete search history.

(56) References Cited

U.S. PATENT DOCUMENTS

| 2015/0206001 | A1* | 7/2015 | Maurer | G06K 9/00805 382/103 |
| 2016/0189323 | A1* | 6/2016 | Wakabayashi | G06K 9/00791 705/325 |
| 2017/0316333 | A1* | 11/2017 | Levinson | G06K 9/00805 |

FOREIGN PATENT DOCUMENTS

| CN | 108062349 A | * | 5/2018 |
| CN | 108062349 A |   | 5/2018 |
| JP | 2014-067383 A |   | 4/2014 |

* cited by examiner

*Primary Examiner* — Ayman A Abaza
(74) *Attorney, Agent, or Firm* — Sughrue Mion, PLLC

(57) ABSTRACT

A behavior monitoring device includes a controller configured to detect the behavior of a person included in a vehicle-mounted camera image. The controller detects a plurality of persons from the vehicle-mounted camera image. The controller detects attribute information of each of the detected persons and correlation information indicating a correlation between the detected persons. The controller evaluates the behavior of each of the detected persons based on the attribute information and the correlation information and to output the result of the evaluation.

11 Claims, 6 Drawing Sheets

BEHAVIOR MONITORING DEVICE, BEHAVIOR MONITORING SYSTEM, AND BEHAVIOR MONITORING PROGRAM

INCORPORATION BY REFERENCE

The disclosure of Japanese Patent Application No. 2018-231199 filed on Dec. 10, 2018 including the specification, drawings and abstract is incorporated herein by reference in its entirety.

BACKGROUND

1. Technical Field

The disclosure relates to a behavior monitoring device, a behavior monitoring system, and a behavior monitoring program.

2. Description of Related Art

In the related art, there is known a monitoring device that uses a camera. For example, Japanese Unexamined Patent Application Publication No. 2014-67383 (JP 2014-67383 A) discloses a system in which the behavior of a subject is monitored by a fixed-point camera and occurrence of an abnormal behavior is quickly and efficiently reported.

SUMMARY

There may be a risk that does not become obvious when analysis of the behavior of a single subject is performed solely. It is desired to improve the accuracy of risk detection performed through behavior monitoring.

The disclosure provides a behavior monitoring device, a behavior monitoring system, and a behavior monitoring program with which it is possible to improve the accuracy of risk detection performed through behavior monitoring.

A first aspect of the disclosure relates to a behavior monitoring device including a controller. The controller is configured detect a behavior of a person included in a vehicle-mounted camera image. The controller detects a plurality of persons from the vehicle-mounted camera image. The controller detects attribute information of each of the detected persons and correlation information indicating a correlation between the detected persons. The controller evaluates a behavior of each of the detected persons based on the attribute information and the correlation information. The outputs a result of the evaluation.

A second aspect of the disclosure relates to a behavior monitoring system including a vehicle and a behavior monitoring device. The behavior monitoring device includes a controller configured to detect a behavior of a person included in a vehicle-mounted camera image of the vehicle. The controller detects a plurality of persons from the vehicle-mounted camera image. The controller detects attribute information of each of the detected persons and correlation information indicating a correlation between the detected persons. The controller evaluates a behavior of each of the detected persons based on the attribute information and the correlation information. The controller outputs a result of the evaluation.

A third aspect of the disclosure relates to a behavior monitoring program. The behavior monitoring program causes a processor to perform a step of detecting a plurality of persons from the vehicle-mounted camera image, a step of detecting attribute information of each of the detected persons and correlation information indicating a correlation between the detected persons, a step of evaluating a behavior of each of the detected persons based on the attribute information and the correlation information, and a step of outputting a result of the evaluation.

With the behavior monitoring device, the behavior monitoring system, and the behavior monitoring program according to the aspects of the disclosure, it is possible to improve the accuracy of risk detection performed through behavior monitoring.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Example of Configuration of Behavior Monitoring System According to Embodiment

Figure 1:
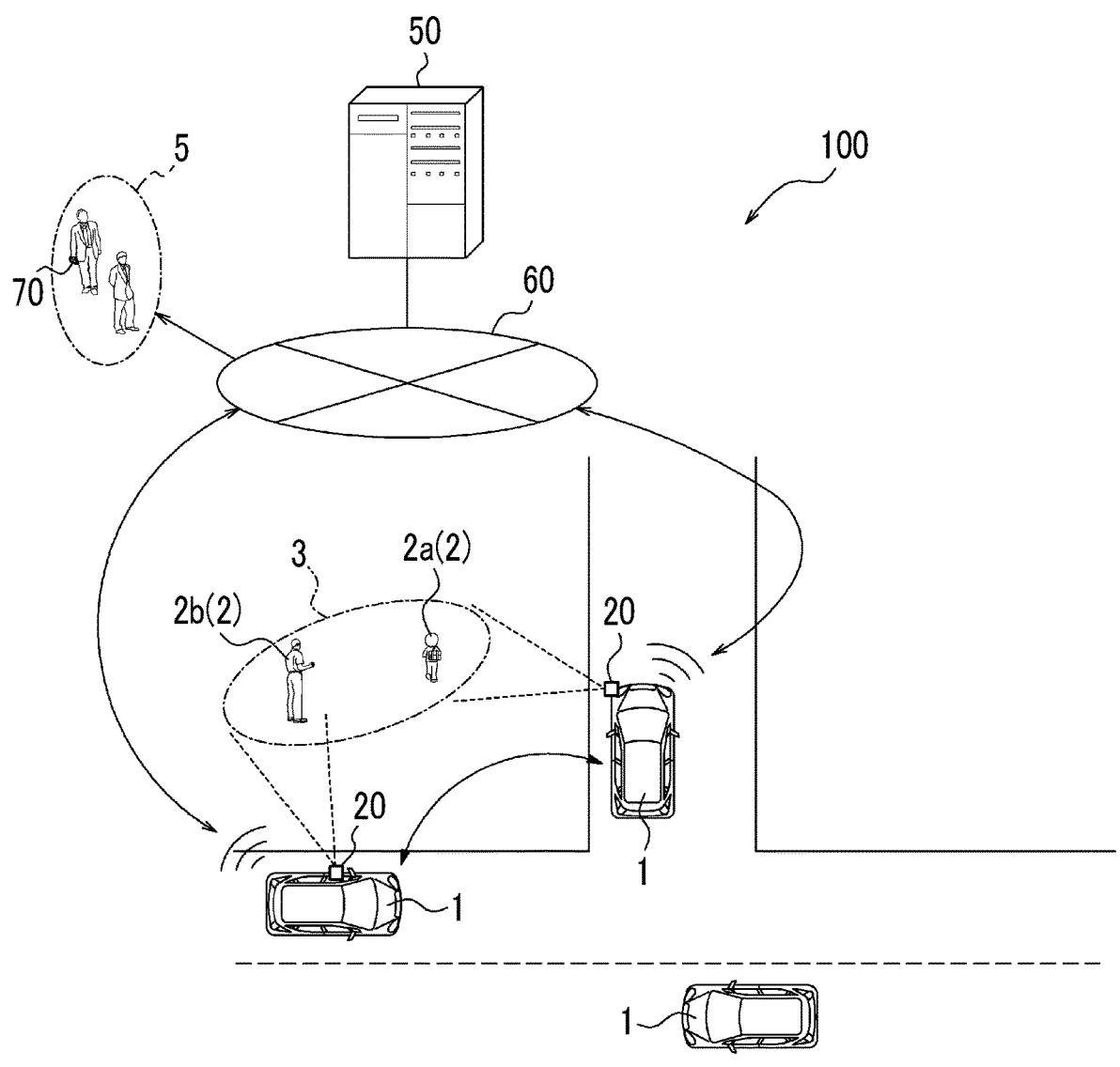
FIG. 1 is a schematic diagram illustrating an example of the configuration of a behavior monitoring system according to an embodiment.
Figure 2:
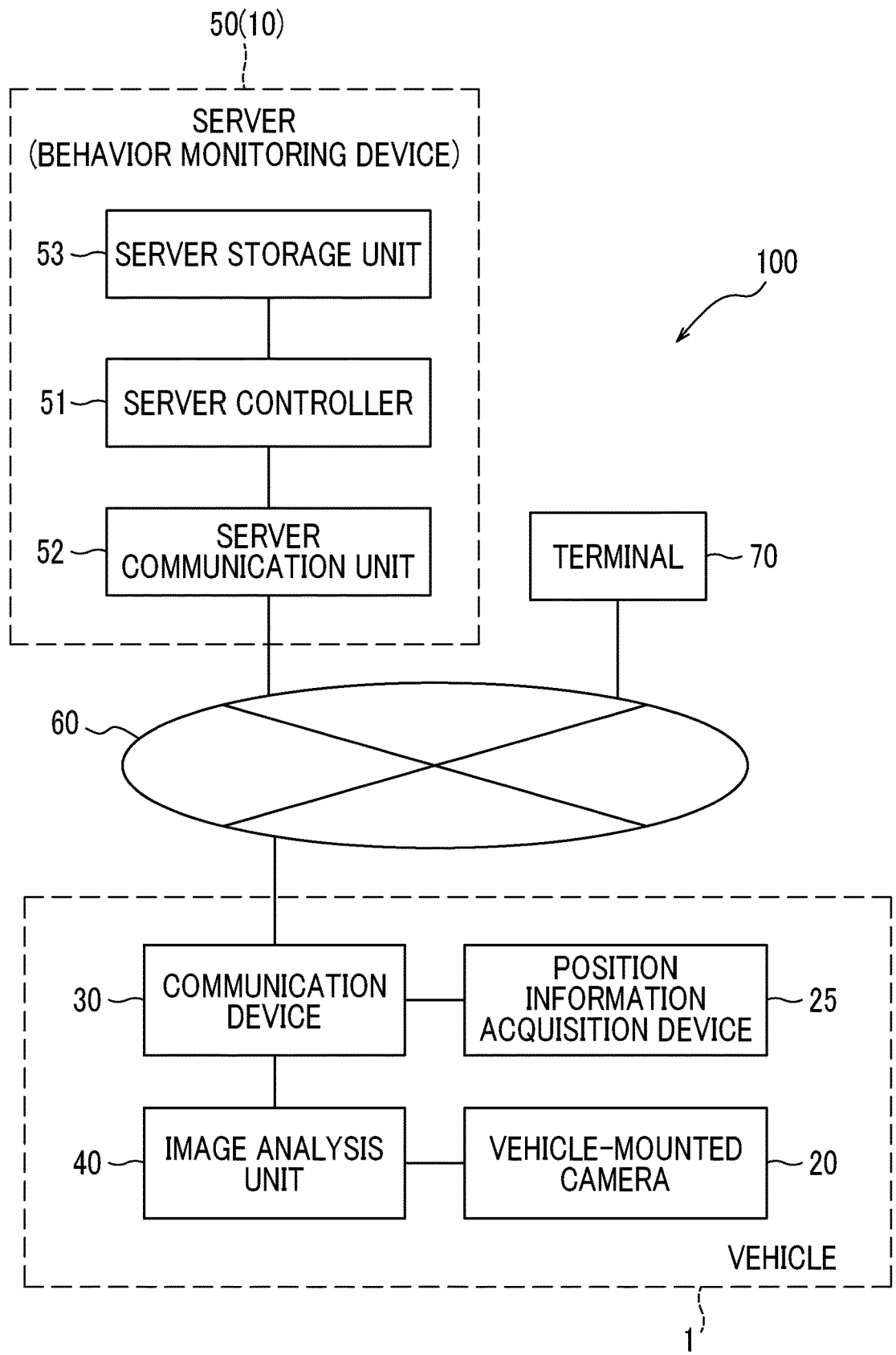
FIG. 2 is a block diagram illustrating a schematic example of the configuration of the behavior monitoring system according to the embodiment.

As shown in FIGS. 1 and 2, a behavior monitoring system 100 according to an embodiment is provided with a vehicle 1. The vehicle 1 is, for example, an automobile. However, the vehicle 1 is not limited to an automobile and the vehicle 1 may be any vehicle. The behavior monitoring system 100 may be provided with a plurality of the vehicles 1. The following description will be made on an assumption that the vehicles 1 can communicate with each other in a case where the behavior monitoring system 100 is provided with the vehicles 1. Each vehicle 1 may communicate with another vehicle 1 via a network 60 and may directly communicate with the other vehicle 1 not via the network 60. The behavior monitoring system 100 may be further provided with a server 50. The following description will be made on an assumption that vehicle 1 can communicate with the server 50. The vehicle 1 may communicate with the server 50 via the network 60.

The server 50 is provided with a server controller 51, a server communication unit 52, and a server storage unit 53. The server controller 51 may include one or more processors. The server communication unit 52 may include a communication module and may communicate with the communication device 30 of the vehicle 1. The server storage unit 53 may include one or more memories. In the present embodiment, the "memories" are semiconductor memories, magnetic memories, optical memories, or the like. However, the memories are not limited thereto. Each memory included in the server storage unit 53 may function as a main storage device, an auxiliary storage device, or a cache memory, for example. The server storage unit 53 may include an electromagnetic storage medium such as a magnetic disk. The server storage unit 53 stores random information used to operate the server 50. For example, the server storage unit 53 may store a system program, an application program, or the like.

The behavior monitoring system 100 is provided with a behavior monitoring device 10. The behavior monitoring device 10 may be realized by one or more processors. The "processors" in the present embodiment are general-purpose processors, dedicated processors dedicated for a specific process, or the like. However, the processors are not limited thereto. The behavior monitoring device 10 may be realized as a portion of the functions of the server 50. That is, the server controller 51 may function as a controller of the behavior monitoring device 10. The behavior monitoring device 10 may be installed in the vehicle 1. The following description will be made on an assumption that the behavior monitoring device 10 in the embodiment as shown in FIG. 2 is realized as a portion of the functions of the server 50.

The behavior monitoring system 100 may be further provided with a terminal 70. The terminal 70 communicates with the behavior monitoring device 10 via the network 60 or not via the network 60. Examples of the terminal 70 may include a portable terminal such as a smartphone. Examples of the terminal 70 may include a machine such as a transceiver. The following description will be made on an assumption that the terminal 70 is carried by a person 5 in an example shown in FIG. 1. Examples of the person 5 who carries the terminal 70 may include a local government staff, a local patrol volunteer, a police officer, and a security guard. The person 5 who carries the terminal 70 may be referred to as a terminal carrier. The terminal 70 includes a notification unit that notifies the terminal carrier of information acquired from the behavior monitoring device 10.

The notification unit may include a display device. The display device may display characters, figures, images, or the like indicating information of which the terminal carrier is to be notified. The display device may include a light emitting device such as a light emission diode (LED). The display device may be a liquid crystal display (LCD), for example. The display device may be an organic electroluminescence (EL) display or an inorganic EL display. The display device may be a plasma display panel (PDP). The display device is not limited to those displays and other various types of displays may also be adopted. The notification unit may include a speaker. The speaker may output a voice indicating information of which the terminal carrier is to be notified. The notification unit may include a vibration device. The vibration device may output a vibration pattern indicating information of which the terminal carrier is to be notified. The disclosure is not limited to those examples and the notification unit may include other various devices.

In the vehicle 1, a vehicle-mounted camera 20, a communication device 30, and an image analysis unit 40 are installed. The vehicle-mounted camera 20, the communication device 30, and the image analysis unit 40 are connected to each other such that the vehicle-mounted camera 20, the communication device 30, and the image analysis unit 40 can communicate with each other via a vehicle-mounted network such as a controller area network (CAN) or a dedicated line.

The communication device 30 communicates with the communication device 30 installed in another vehicle 1. The communication device 30 may communicate with the communication device 30 installed in the other vehicle 1 via the network 60. The communication device 30 may directly communicate with the communication device 30 installed in the other vehicle 1 not via the network 60. In the present embodiment, the following description will be made on an assumption that the vehicles 1 communicate with each other via the network 60. The communication device 30 may communicate with the server 50 via the network 60. The communication device 30 may be a vehicle-mounted communication machine such as a data communication module (DCM), for example. The communication device 30 may include a communication module connected to the network 60. The communication module may include a communication module conforming to mobile communication standards such as the 4th Generation (4G) and the 5th Generation (5G). However, the disclosure is not limited thereto.

The vehicle-mounted camera 20 images a person 2 present in the vicinity of the vehicle 1 as a monitoring target of the behavior monitoring system 100. The vehicle-mounted camera 20 may image a person 2*a* who walks alone, as a monitoring target of the behavior monitoring system 100. The vehicle-mounted camera 20 may image a plurality of persons 2*b* gathering together or a group 3 including the persons 2*b*, as a monitoring target of the behavior monitoring system 100. The vehicles 1 may share an image of the person 2 which is captured by the vehicle-mounted camera 20 between the vehicles 1 and the vehicles 1 may transmit the image to the server 50.

The vehicle-mounted camera 20 images a target positioned in the vicinity of the vehicle 1 or positioned in a vehicle cabin. An image captured by the vehicle-mounted camera 20 may be referred to as a vehicle-mounted camera image. The following description will be made on an assumption that the vehicle-mounted camera image is associated with information relating to a position where the vehicle-mounted camera image is captured or information relating to a timing when the vehicle-mounted camera image is captured. The vehicle-mounted camera image may include a still image and may include a moving image.

A position information acquisition device 25 may be further installed in the vehicle 1. The position information acquisition device 25 is connected to other components installed in the vehicle 1 such that the position information acquisition device 25 can communicate with the other components via a vehicle-mounted network such as a CAN or a dedicated line. The position information acquisition device 25 acquires information about the position of the vehicle 1. The position information acquisition device 25 may include a receiver for a satellite navigational system. The examples of the receiver for the satellite navigational system may include a global positioning system (GPS) receiver. The following description will be made on an assumption that the vehicle 1 in the present embodiment can acquire information about the position of the vehicle 1 by using the position information acquisition device 25. The vehicle 1 may associate the vehicle-mounted camera image with the information about the position of the vehicle 1, which is acquired by means of the position information acquisition device 25, as the information relating to a position where the vehicle-mounted camera image is captured.

Figure 3:
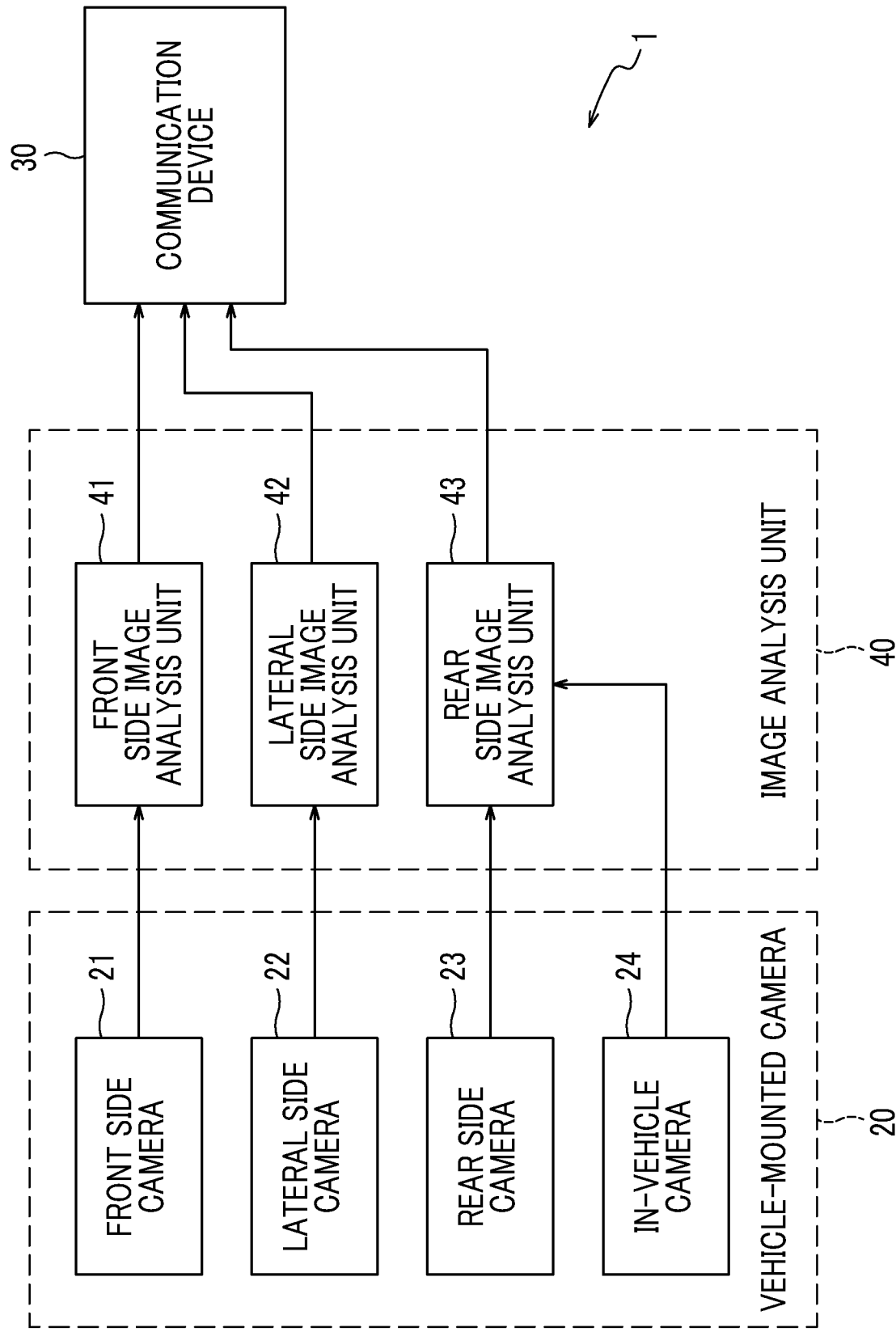
FIG. 3 is a block diagram illustrating an example of the configurations of a vehicle-mounted camera and an image analysis unit.

The vehicle-mounted camera 20 may be provided with at least one of a front side camera 21, a lateral side camera 22, a rear side camera 23 and an in-vehicle camera 24 as shown in FIG. 3. The front side camera 21 images a target positioned in front of the vehicle 1. An image captured by the front side camera 21 may be referred to as a front side image. The lateral side camera 22 images a target positioned beside the vehicle 1. An image captured by the lateral side camera 22 may be referred to as a lateral side image. The rear side camera 23 images a target positioned behind the vehicle 1. An image captured by the rear side camera 23 may be referred to as a rear side image. The in-vehicle camera 24 images a target positioned inside the vehicle cabin of the vehicle 1 and a target positioned behind the vehicle 1. An image captured by the in-vehicle camera 24 may be referred to as an in-vehicle image.

The image analysis unit 40 analyzes the vehicle-mounted camera image and outputs the result of the analysis to the communication device 30. The image analysis unit 40 may be realized by one or more processors. The image analysis unit 40 may be included in the vehicle-mounted camera 20. The image analysis unit 40 may include a front side image analysis unit 41 that acquires the front side image from the front side camera 21 and analyzes the front side image. The image analysis unit 40 may include a lateral side image analysis unit 42 that acquires the lateral side image from the lateral side camera 22 and analyzes the lateral side image. The image analysis unit 40 may include a rear side image analysis unit 43 that acquires the rear side image from the rear side camera 23, acquires the in-vehicle image from the in-vehicle camera 24, and analyzes the rear side image and an image of a target behind the vehicle 1 that is included in the in-vehicle image.

The image analysis unit 40 detects an image of the person 2 or the group 3 including a plurality of the persons 2 from the vehicle-mounted camera image and outputs the image to the behavior monitoring device 10. The image of the person 2 or the group 3 may be referred to as a monitoring target image.

The vehicle 1 may not be provided with the image analysis unit 40. In a case where the vehicle 1 is not provided with the image analysis unit 40, the vehicle-mounted camera 20 may output, via the communication device 30, the vehicle-mounted camera image to the server 50 that realizes the functions of the behavior monitoring device 10. The behavior monitoring device 10 detects the monitoring target image from the vehicle-mounted camera image.

Information including at least one of the vehicle-mounted camera image and the monitoring target image may be referred to as camera output information. It can be said that the behavior monitoring device 10 acquires the camera output information regardless of whether the vehicle 1 is provided with the image analysis unit 40 or not. The behavior monitoring device 10 monitors the behavior of the person 2 or the group 3 based on the monitoring target image. In a case where the camera output information includes the monitoring target image, the behavior monitoring device 10 extracts the monitoring target image from the camera output information and monitors the behavior of the person 2 or the group 3 based on the extracted monitoring target image. In a case where the camera output information includes the vehicle-mounted camera image, the behavior monitoring device 10 extracts the monitoring target image from the vehicle-mounted camera image and monitors the behavior of the person 2 or the group 3 based on the extracted monitoring target image.

The monitoring target of the behavior monitoring system 100 shown in FIG. 1 is the group 3 including the person 2a and the person 2b. The behavior monitoring device 10 detects, as the monitoring target image, an image including the persons 2a, 2b from the vehicle-mounted camera image.

The behavior monitoring device 10 detects attribute information of the person 2 based on the monitoring target image. The attribute information of the person 2 may include position information based on information relating to a place where the monitoring target image is captured. The attribute information of the person 2 may include information relating to a timing when the monitoring target image is captured.

The attribute information of the person 2 may include information indicating the age group, the sex, or the like of the person 2, for example. Age group categories may include a category for children and a category for adults, for example. For example, infants, elementary school students, junior high school students, high school students, and the like may be included in the age group categorized as children. In the example shown in FIG. 1, the behavior monitoring device 10 may detect attribute information with which the person 2a is categorized as an elementary school student and detect attribute information with which the person 2b is categorized as an adult.

The attribute information of the person 2 may include information relating to the appearance of the person 2 like the clothes or belongings of the person 2. Information relating to the clothes of the person 2 may include information on whether the person 2 is in a uniform or in plain clothes, for example. Information relating to the belongings of the person 2 may include information on whether the person 2 has a bag or not, for example. In the example shown in FIG. 1, the behavior monitoring device 10 may detect that the person 2a is wearing a schoolchild's satchel, as the attribute information.

The attribute information of the person 2 may include information relating to the face of the person 2. The information relating to the face of the person 2 may include information relating to eyes such as the line of sight of the person 2 or an expression of the eyes of the person 2 or information relating to an expression on the face of the person 2, for example. The information relating to the face of the person 2 may include information indicating an emotion estimated based on an expression on the face of the person 2. In the example shown in FIG. 1, the behavior monitoring device 10 may detect that the person 2b is looking at the person 2a, as the attribute information of the person 2b.

The attribute information of the person 2 may include information indicating the behavior of the person 2. In a case where the monitoring target image includes a moving image, the behavior monitoring device 10 may detect the information indicating the behavior of the person 2 based on the moving image. The behavior monitoring device 10 may detect the person 2 from each of a plurality of monitoring target images captured at different timings to detect the information indicating the behavior of the person 2. The information indicating the behavior of the person 2 may include information indicating whether the person 2 is staying at one place or the person 2 is moving, information indicating that the person 2 is wobbling, or the like. In the example shown in FIG. 1, the behavior monitoring device 10 may detect that the person 2a and the person 2b are walking in a predetermined direction, as the attribute information of the person 2a and the person 2b.

The disclosure is not limited to those examples and the attribute information of the person 2 may include various kinds of information.

The behavior monitoring device 10 detects, based on the monitoring target image, correlation information indicating a correlation between the persons 2. The behavior monitoring device 10 may assume the group 3 including two or more persons 2 and detect information indicating a correlation between the persons 2 included in the group 3, as the correlation information. The group 3 may include two or more persons 2 present within a predetermined area. The group 3 may include two or more persons 2 included in one monitoring target image. The group 3 may include solely a portion of the persons 2 included in one monitoring target image. The group 3 may include the person 2 included in a certain monitoring target image and the person 2 included in another monitoring target image.

In the example shown in FIG. 1, the behavior monitoring device 10 assumes the group 3 including the person 2a and the person 2b. The behavior monitoring device 10 detects the correlation information indicating a correlation between the person 2a and the person 2b.

The correlation information may include information indicating a distance between the person 2a and the person 2b. The behavior monitoring device 10 may detect that the person 2a and the person 2b are separate from each other by a first distance, as the correlation information of the group 3. As the correlation information of the group 3, the behavior monitoring device 10 may detect that a state where the person 2a and the person 2b are separate from each other by the first distance has continued for a predetermined time based on information relating to the behavior of the person 2a or the person 2b.

The behavior monitoring device 10 may detect information indicating that the person 2a and the person 2b are families, friends, or acquaintances, as the correlation information of the group 3. The behavior monitoring device 10 may detect information indicating that the person 2a and the person 2b have no acquaintance with each other, as the correlation information of the group 3.

The behavior monitoring device 10 monitors the person 2 or the person 2 included in the group 3, based on the attribute information of the person 2 and the correlation information of the group 3. In the example shown in FIG. 1, the behavior monitoring device 10 detects that there is a possibility that the person 2b is interested in the person 2a based on the attribute information indicating that the person 2b is looking at the person 2a. The behavior monitoring device 10 may detect that there is a possibility that the person 2b follows the person 2a based on the correlation information indicating that a state where the person 2a and the person 2b are separate from each other by the first distance has continued for the predetermined time.

The behavior monitoring device 10 may detect that there is a possibility that the person 2b performs an abnormal behavior based on the result of detection relating to the person 2b. That is, the behavior monitoring device 10 may evaluate the behavior of the person 2b based on the attribute information of the person 2b and the correlation information of the group 3 including the person 2b. The behavior monitoring device 10 may output whether there is a possibility that the person 2b performs an abnormal behavior, as the result of the evaluation of the behavior of the person 2b.

The behavior monitoring device 10 may detect that there is a possibility that the person 2a is involved in an abnormal behavior. That is, the behavior monitoring device 10 may evaluate whether there is a possibility that the person 2a is exposed to a risk based on the correlation information of the group 3 including the person 2a. The behavior monitoring device 10 may output whether there is a possibility that the person 2a is exposed to a risk, as the result of the evaluation of the behavior of the person 2a.

The behavior monitoring device 10 may calculate a score for evaluation of the behavior of the person 2 based on the attribute information of the person 2 and the correlation information of the group 3 including the person 2. The score for evaluation of the behavior of the person 2 will be referred to as the behavior evaluation value of the person 2. The behavior monitoring device 10 may calculate a score indicating a possibility that the person 2 performs an abnormal behavior, as the behavior evaluation value. The score indicating a possibility that the person 2 performs an abnormal behavior will be referred to as the behavioral riskiness of the person 2. The following description will be made on an assumption that the behavioral riskiness is a type of the behavior evaluation value. The calculation may be performed such that the higher the possibility that the person 2 performs an abnormal behavior, the higher the value of the behavioral riskiness of the person 2. The calculation may be performed such that the higher the possibility that the person 2 performs an abnormal behavior, the lower the value of the behavioral riskiness of the person 2. The calculation may be performed such that the higher the possibility that the person 2 performs an abnormal behavior, the higher the absolute value of the behavioral riskiness of the person 2.

In the present embodiment, the following description will be made on an assumption that the higher the possibility that the person 2 performs an abnormal behavior, the higher the value of the behavioral riskiness of the person 2. In the example shown in FIG. 1, the behavior monitoring device 10 may detect a frequency at which the person 2b looks at the person 2a as the attribute information and may perform the calculation such that the higher the frequency at which the person 2b looks at the person 2a, the higher the behavioral riskiness of the person 2b. The behavior monitoring device 10 may perform the calculation such that the longer a time for which the person 2b is present within a predetermined distance from the person 2a, the higher the behavioral riskiness of the person 2b. The disclosure is not limited to those examples and the behavior monitoring device 10 may calculate the behavior evaluation value or the behavioral riskiness of the person 2 based on various kinds of information included in the attribute information of the person 2 and the correlation information of the group 3 including the person 2. The behavior monitoring device 10 may output the behavior evaluation value as the result of the evaluation.

In the behavior monitoring system 100 shown in FIG. 1, the behavior monitoring device 10 may output, as the result of the evaluation of the behavior of the person 2b, a fact that there is a possibility that the person 2b performs an abnormal behavior in a case where the behavioral riskiness of the person 2b satisfies predetermined conditions. the behavior monitoring device 10 may output, as the result of the evaluation of the behavior of the person 2a, a fact that there is a possibility that the person 2a present within a predetermined area around the person 2b is involved in an abnormal behavior in a case where the behavioral riskiness of the person 2b satisfies the predetermined conditions. In other words, the behavior monitoring device 10 may output the level of a risk to which the person 2a is exposed, as the result of the evaluation of the behavior of the person 2a. The predetermined conditions may include a condition that the behavioral riskiness is equal to or greater than a predetermined value, for example.

Abnormal behaviors of the person 2 are not limited to a behavior that influences another person 2 like a behavior that causes harm to the other person 2 and may include a behavior that does not influence the other person 2 like a behavior of falling down due to own action of the person 2. It can be said that an abnormal behavior that does not influence the other person 2 is less likely to influence the level of the risk to which the other person 2 is exposed.

The behavior monitoring device 10 may output the result of the evaluation of the behavior of the person 2 to the terminal 70. The result of the evaluation output to the terminal 70 may include information about the position of the person 2. The terminal 70 may perform notification by means of a warning indicating that there is a possibility that the person 2 performs an abnormal behavior, based on the result of the evaluation of the behavior of the person 2. Since the terminal 70 performs notification by means of a warning, the terminal carrier can recognize that there is a possibility that the person 2 performs an abnormal behavior. When the terminal carrier goes toward the person 2 based on the information about the position of the person 2, occurrence of an abnormal behavior may be prevented. In the example shown in FIG. 1, the person 5 who carries the terminal 70 may go toward the person 2b. As a result, the safety of an area is improved.

The behavior monitoring device 10 may output the result of the evaluation of the behavior of the person 2 to the vehicle 1. In a case where there is a possibility that the person 2 performs an abnormal behavior, the behavior monitoring device 10 may output, to the vehicle 1 positioned within a predetermined area around the person 2, an instruction to track the person 2. In a case where the vehicle 1 travels based on the instruction to track the person 2, the vehicle 1 may travel such that the vehicle-mounted camera 20 can image the person 2. In a case where the vehicle 1 is subjected to autonomous driving control, the behavior monitoring device 10 may output autonomous driving control information such that the vehicle 1 travels tracking the person 2. In a case where the vehicle 1 is driven by a driver, the behavior monitoring device 10 may output information designating a traveling route for the driver and cause a car navigation system or the like installed in the vehicle 1 to display the information. When the vehicle 1 tracks the person 2 who possibly performs an abnormal behavior, occurrence of an abnormal behavior may be prevented. In the example shown in FIG. 1, the vehicle 1 provided with the vehicle-mounted camera 20 imaging the person 2b may continuously track the person 2b. Another vehicle 1 may acquire information about the position of the person 2b and start to track the person 2b such that the person 2b is imaged. As a result, the safety of an area is improved.

As described above, the behavior monitoring device 10 according to the embodiment can evaluate the behavior of the person 2. When the behavior of the person 2 is evaluated, a risk caused by the behavior of the person 2 may be expected. The behavior monitoring device 10 may detect the sign of an abnormal behavior, which may not be noticed when the behavior of the person 2 is evaluated as an individual behavior, since the behavior of the person 2 is evaluated based on the correlation information. That is, there may be an improvement in risk expectation accuracy. As a result, the safety of an area is improved.

The behavior monitoring device 10 can evaluate the behavior of the person 2 by using the vehicle-mounted camera image. When the vehicle-mounted camera image is used, a range in which the person 2 is detected may be enlarged in comparison with a case where an image captured by a fixed-point camera is used. In other words, the blind spot of monitoring may be reduced. As a result, there may be an improvement in risk expectation accuracy.

Example of Behavior Monitoring Method

Figure 4:
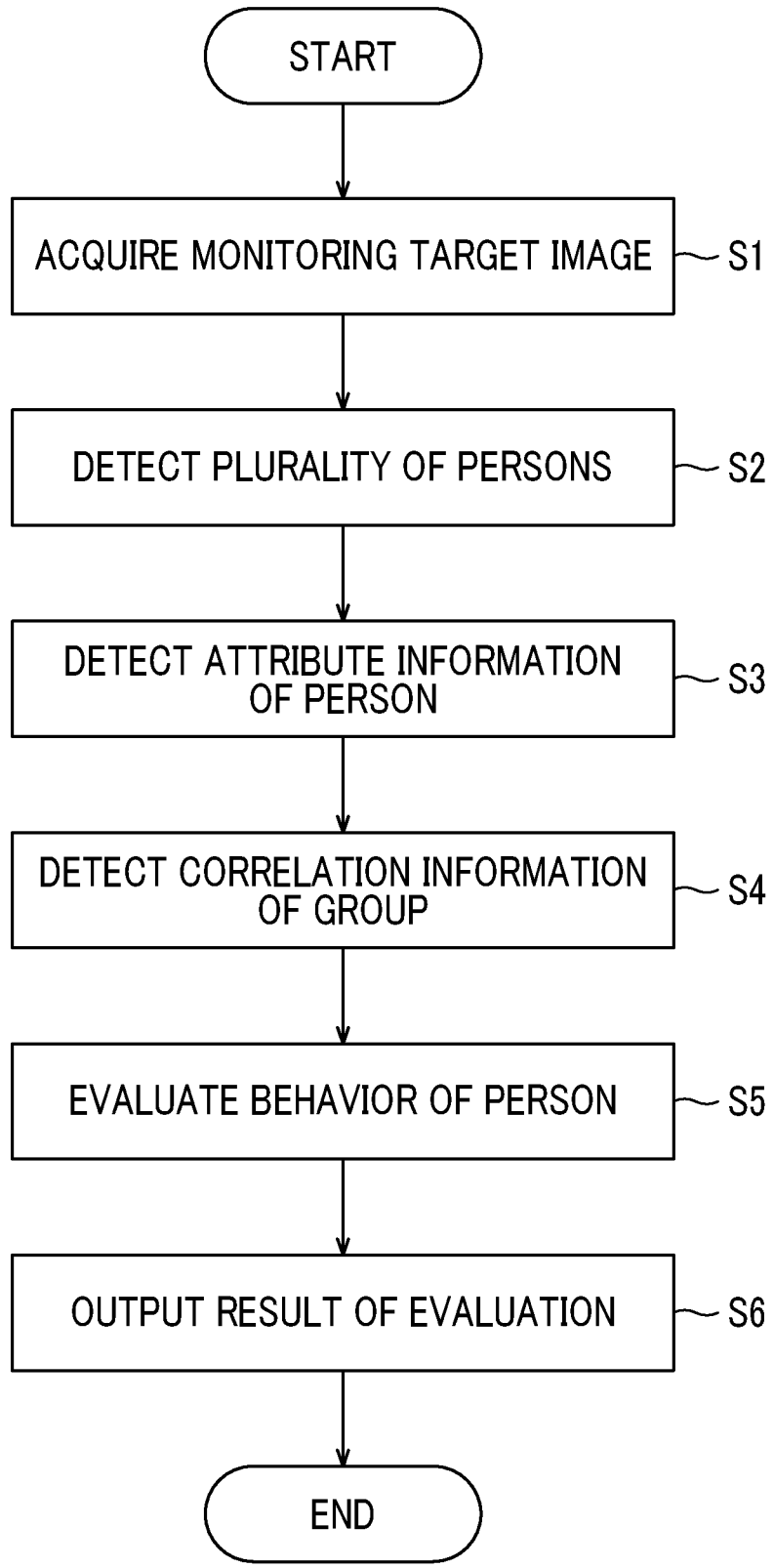
FIG. 4 is a flowchart illustrating an example of processes in a behavior monitoring method.

The behavior monitoring device 10 may perform a behavior monitoring method including processes as in a flowchart shown in FIG. 4. The behavior monitoring method may be realized as a behavior monitoring program executed by a processor.

The behavior monitoring device 10 acquires the monitoring target image (step S1). The behavior monitoring device 10 acquires the camera output information from the vehicle-mounted camera 20 or the image analysis unit 40. In a case where the camera output information includes the monitoring target image, the behavior monitoring device 10 extracts the monitoring target image from the camera output information. In a case where the camera output information includes the vehicle-mounted camera image, the behavior monitoring device 10 detects the monitoring target image from the vehicle-mounted camera image.

The behavior monitoring device 10 detects the persons 2 from the monitoring target image (step S2).

The behavior monitoring device 10 detects the attribute information of the persons 2 based on the monitoring target image (step S3).

The behavior monitoring device 10 assumes the group 3 including the persons 2 and detects the correlation information of the persons 2 included in the group 3 (step S4).

The behavior monitoring device 10 evaluate the behaviors of the persons 2 based on the attribute information of the persons 2 and the correlation information of the group 3 including the persons 2 (step S5).

The behavior monitoring device 10 outputs the result of the evaluation of the behaviors of the persons 2 (step S6). The behavior monitoring device 10 may output the result of the evaluation to the terminal 70 and may output the result of the evaluation to the vehicle 1. The behavior monitoring device 10 terminates the processes shown in the flowchart in FIG. 4 after performing the process in step S6.

The behavior monitoring device 10 may calculate the behavior evaluation values of the persons 2 in a process of evaluating the behaviors of the persons 2 in step S5. The behavior monitoring device 10 may calculate, as the behavior evaluation values of the persons 2, the behavioral riskiness of the persons 2.

As described above, in the case of the behavior monitoring method according to the embodiment, the behavior of the person 2 is evaluated. When the behavior of the person 2 is evaluated, a risk caused by the behavior of the person 2 may be expected. In the case of the behavior monitoring method according to the embodiment, the sign of an abnormal behavior, which may not be noticed when the behavior of the person 2 is evaluated as an individual behavior, may be detected since the behavior of the person 2 is evaluated based on the correlation information. That is, there may be an improvement in risk expectation accuracy. As a result, the safety of an area is improved.

In the case of the behavior monitoring method according to the embodiment, the behavior of the person 2 is evaluated by means of the vehicle-mounted camera image. When the vehicle-mounted camera image is used, a range in which the person 2 is detected may be enlarged in comparison with a case where an image captured by a fixed-point camera is used. In other words, the blind spot of monitoring may be reduced. As a result, there may be an improvement in risk expectation accuracy.

Figure 5:
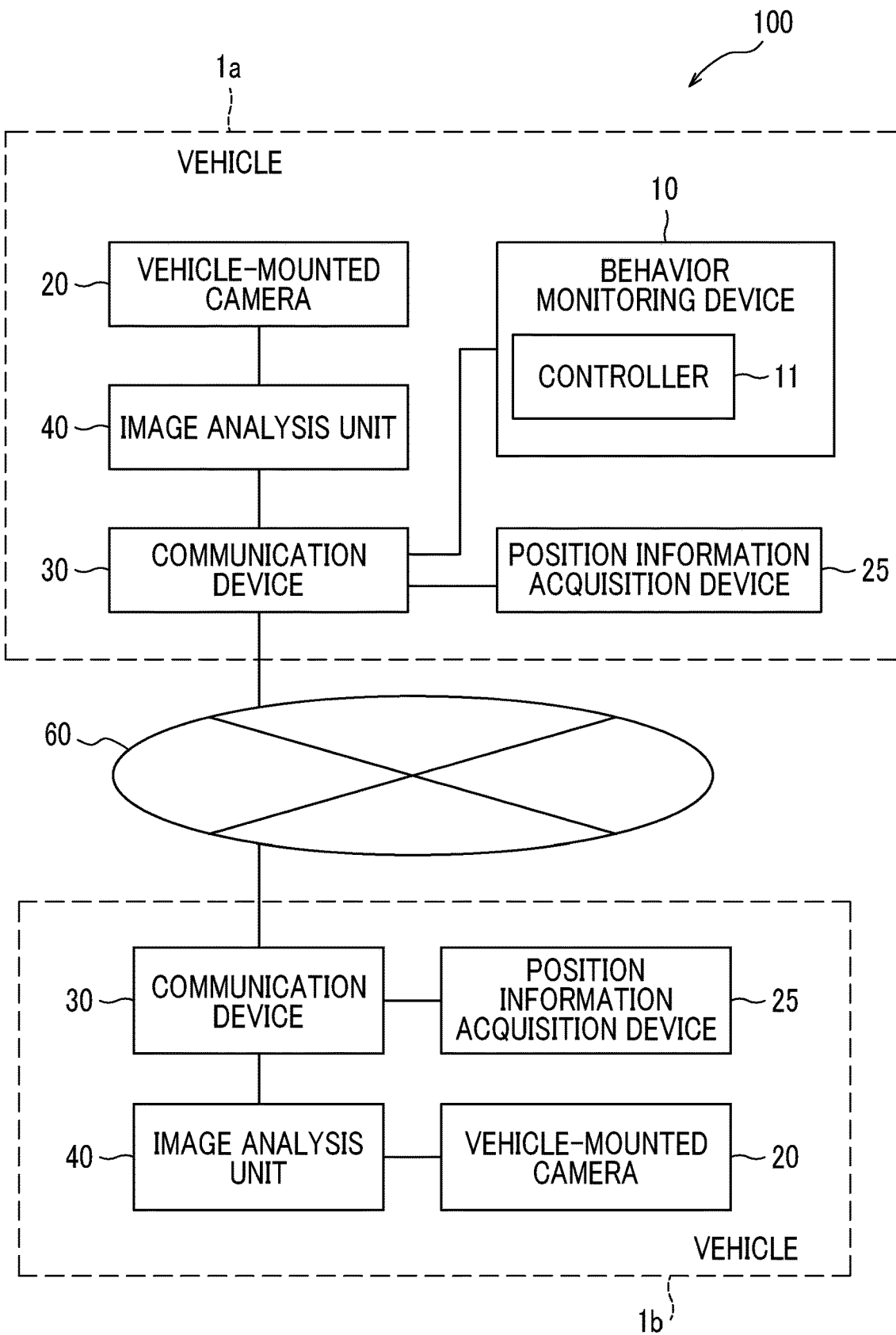
FIG. 5 is a block diagram illustrating an example of the configuration of the behavior monitoring system including a vehicle provided with the behavior monitoring device.

Example of Configuration in Case where Behavior Monitoring Device is Installed in Vehicle As shown in FIG. 5, the behavior monitoring device 10 may be installed in the vehicle 1. In a case where the behavior monitoring device 10 is installed in the vehicle 1, the behavior monitoring device 10 may be realized as a portion of the functions of an electronic control unit (ECU) of the vehicle 1. The vehicle 1 in which the behavior monitoring device 10 is installed will be referred to as a vehicle 1a. The following description will be made on an assumption that the behavior monitoring device 10, the vehicle-mounted camera 20, the position information acquisition device 25, the communication device 30, and the image analysis unit 40 are installed in the vehicle 1a. The behavior monitoring device 10 may be provided with a controller 11. The controller 11 may be realized by one or more processors. The vehicle 1 in which no behavior monitoring device 10 is installed will be referred to as a vehicle 1b. The following description will be made on an assumption that the vehicle-mounted camera 20, the position information acquisition device 25, the communication device 30, and the image analysis unit 40 are installed in the vehicle 1b.

The vehicle-mounted camera 20 or the image analysis unit 40 of the vehicle 1a may output the camera output information to the behavior monitoring device 10 of the vehicle 1a. In a case where the behavior monitoring system 100 is provided with a plurality of the vehicles 1a, the vehicle-mounted camera 20 or the image analysis unit 40 of the vehicle 1a may output the camera output information to the behavior monitoring device 10 installed in another vehicle 1a. In a case where the behavior monitoring system 100 is provided with the server 50 realizing the functions of the behavior monitoring device 10, the vehicle-mounted camera 20 or the image analysis unit 40 of the vehicle 1a may output the camera output information to the server 50.

Even in a case where the behavior monitoring device 10 is installed in the vehicle 1a, the behavior monitoring device 10 can perform the same operation as in a case where the behavior monitoring device 10 is realized as a portion of the functions of the server 50. The behavior monitoring device 10 installed in the vehicle 1a may output the result of the evaluation of the behavior of the person 2 to the vehicle 1a. The vehicle 1a may track the person 2 based on the result of the evaluation. That is, the vehicle 1a may travel based on the result of the evaluation of the behavior of the person 2 which is performed by the behavior monitoring device 10 installed in the vehicle 1a.

Example of Configuration in which Risk-Reducing Behavior is Detected

In FIG. 1, the monitoring target of the behavior monitoring system 100 is the group 3 including the person 2a and the person 2b. For example, the following description will be made on an assumption that the person 2 different from the person 2a and the person 2b is also included in the group 3. The person 2 different from the person 2a and the person 2b will be referred to as a third person in the present configuration example. The following description will be made on an assumption that the behavior monitoring device 10 calculates, based on the correlation information of the group 3 including the person 2a and the person 2b, the behavioral riskiness of the person 2b as being a high value in a case where the third person is not included in the group 3.

In a case where the group 3 include the third person in addition to the persons 2a, 2b, the behavior monitoring device 10 detects the attribute information of the third person and detects the correlation information of the group 3 including the third person. In a case where the third person is the person 2 who may contribute to improvement in safety of an area like a local patrol volunteer or a security guard, the behavior monitoring device 10 may determine that a possibility that the person 2b performs an abnormal behavior is reduced by the presence of the third person and set the behavioral riskiness of the person 2b lower. Meanwhile, the behavior monitoring device 10 may calculate, as the behavior evaluation value of the third person, a score indicating a possibility that the third person prevents the person 2 from performing an abnormal behavior. The score indicating a possibility that the person 2 prevents another person 2 from performing an abnormal behavior will be referred to as the behavioral safety of the person 2. The following description will be made on an assumption that the behavioral safety is a type of the behavior evaluation value. The calculation may be performed such that the higher the possibility that the person 2 prevents another person 2 from performing an abnormal behavior, the higher the behavioral safety of the person 2 and the calculation may be performed such that the higher the possibility that the person 2 prevents another person 2 from performing an abnormal behavior, the lower the behavioral safety of the person 2. The calculation may be performed such that the higher the possibility that the person 2 prevents another person 2 from performing an abnormal behavior, the higher the absolute value of the behavioral safety of the person 2. The behavioral safety and the behavioral riskiness may be calculated independently of each other.

In the present embodiment, the following description will be made on an assumption that the higher the possibility that the person 2 prevents another person 2 from performing an abnormal behavior, the higher the behavioral safety of the person 2. The behavior monitoring device 10 may calculate the behavioral riskiness and the behavioral safety of each person 2 included in the group 3 and reduce the behavioral riskiness of a certain person 2 based on the behavioral safety of another person 2.

The behavioral safety may be represented by a value of which the sign is different from that of the behavioral riskiness. For example, in a case where the behavioral riskiness is represented by a positive value, the behavioral safety may be represented by a negative value. In this case, the behavior monitoring device 10 can update the behavioral riskiness of the person 2b by calculating the sum of the behavioral riskiness of the person 2b and the behavioral safety of the third person. As a result, the behavior monitoring device 10 can easily manage the behavior evaluation value.

The behavior monitoring device 10 may determine the behavior of the person 2, of which the behavioral safety is high, as a safety behavior that reduces a risk to which a nearby person 2 such as the person 2 included in the group 3 is exposed. The behavior monitoring device 10 may determine the behavior of the person 2, of which the behavioral riskiness is high, as an abnormal behavior that increases a risk to which a nearby person 2 such as the person 2 included in the group 3 is exposed.

In a case where the behavior monitoring device 10 detects that the person 2 included in the group 3 is looking at a portable terminal such as a smartphone or a magazine, a newspaper, and the like, the behavior monitoring device 10 may calculate both of the behavioral safety and the behavioral riskiness of the person 2 as being low values. The person 2 of which both the behavioral safety and the behavioral riskiness are low is not likely to increase and reduce the behavioral riskiness of another person 2 included in the group 3 or a risk to which the other person 2 is exposed. The behavior monitoring device 10 may determine the behavior of the person 2, of which both the behavioral safety and the behavioral riskiness are low, as a normal behavior which is neither a safety behavior nor an abnormal behavior.

In a case where the group 3 include the persons 2 each of which has the behavioral safety, the behavior monitoring device 10 may update the behavioral safety to a higher value in consideration of a multiplier effect of the behaviors of the persons 2. In a case where the group 3 include the persons 2 each of which has the behavioral riskiness, the behavior monitoring device 10 may update the behavioral riskiness to a higher value in consideration of a multiplier effect of the behaviors of the persons 2.

Example of Behavior Detection in Chronological Order

The behavior monitoring device 10 may acquire monitoring target images captured at a plurality of timings. The following description will be made on an assumption that the behavior monitoring device 10 acquires a first-timing image captured at a first timing and a second-timing image captured at a second timing, for example. The behavior monitoring device 10 may detect the persons 2 respectively included the first-timing image and the second-timing image and specify the person 2 who is included in both of the first-timing image and the second-timing image. In this case, the behavior monitoring device 10 can monitor the behavior of the person 2 included in both of the first-timing image and the second-timing image in a chronological order.

The behavior monitoring device 10 detects the attribute information of the person 2 and the correlation information of the group 3 including the person 2 at the first timing and the attribute information of the person 2 and the correlation information of the group 3 including the person 2 at the second timing and compares the attribute information of the person 2 and the correlation information of the group 3 including the person 2 at the first timing and the attribute information of the person 2 and the correlation information of the group 3 including the person 2 at the second timing with each other. The behavior monitoring device 10 may detect the level of a risk to which the person 2 is exposed based on a difference between the attribute information of the person 2 at the first timing and the attribute information of the person 2 at the second timing. The behavior monitoring device 10 may detect the level of a risk to which the person 2 is exposed based on a difference between the correlation information of the group 3 including the person 2 at the first timing and the correlation information of the group 3 including the person 2 at the second timing.

The behavior monitoring device 10 may detect that a risk to which the persons 2 included in the group 3 is exposed has been increased at the second timing in a case where the number of the persons 2 included in the group 3 at the second timing is smaller than the number of the persons 2 included in the group 3 at the first timing, for example.

The following description will be made on an assumption that the behavior monitoring device 10 has detected that the positional relationship between the persons 2a, 2b shown in FIG. 1 at the first timing is not different from that at the second timing, for example. The behavior monitoring device 10 may detect that a risk to which the person 2a is exposed has been increased in a case where the behavior monitoring device 10 also detects that the number of the persons 2 included in the group 3, in which the persons 2a, 2b are included, at the second timing is smaller than the number of the persons 2 included in the group 3 at the first timing.

In a case where there is a difference between the attribute information of each person 2 included in the group 3 at the first timing and the attribute information of each person 2 included in the group 3 at the second timing, the behavior monitoring device 10 may calculate the level of a risk to which each person 2 included in the group 3 is exposed based on the difference.

Example of Information Included in Correlation Information

The behavior monitoring device 10 may detect various kinds of information as the correlation information of the group 3 including the persons 2 and evaluate the behaviors of the persons 2.

In a case where the behavior monitoring device 10 detects that the persons 2 included in the group 3 are in similar clothes since the persons 2 are in uniforms or the like, the behavior monitoring device 10 may detect the correlation information indicating that the persons 2 belong to an organization such as a school or a company. The behavior monitoring device 10 may calculate the behavioral safety of each person 2 included in the group 3, from which the correlation information as described above is detected, as being a high value and may calculate the behavioral riskiness thereof as being a low value.

The behavior monitoring device 10 may detect the correlation information indicating that there is a group formed by the persons 2 gathering together within a predetermined area and some of the persons 2 are surrounded by a large number of the other persons 2, the persons 2 being included in the group 3. The behavior monitoring device 10 may detect the correlation information indicating which person 2 is being focused on in the group, based on the line of sight of each person 2. For example, the behavior monitoring device 10 may detect the correlation information of the group 3 including a child to monitor whether there is a behavior that may lead to bullying in the group 3. The behavior monitoring device 10 may calculate the behavioral riskiness of the person 2 included in the group 3, from which the correlation information as described above is detected, as being a high value.

For example, in a case where an old person is included in the group 3, the behavior monitoring device 10 may calculate the behavioral riskiness of the old person as being a high value. Meanwhile, in a case where a behavior of helping the old person is detected as the behavior of another person 2 included in the group 3, the behavior monitoring device 10 may update the behavioral riskiness of the old person to a low value. The behavior monitoring device 10 may calculate the behavioral safety of the person 2 helping the old person as being a high value.

For example, in a case where the behavior monitoring device 10 detects that the persons 2 are relaxed as information relating to the emotion of the persons 2 included in the group 3, the behavior monitoring device 10 may detect the correlation information indicating that the persons 2 included in the group 3 are families, friends, or acquaintances. The behavior monitoring device 10 may calculate the behavioral safety of each person 2 included in the group 3, from which the correlation information as described above is detected, as being a high value and may calculate the behavioral riskiness thereof as being a low value.

For example, in a case where the behavior monitoring device 10 detects that the persons 2 included in the group 3 are nervous as information relating to the emotion of the persons 2 included in the group 3, the behavior monitoring device 10 may detect the correlation information indicating that the persons 2 included in the group 3 have no acquaintance with each other. The behavior monitoring device 10 may calculate the behavioral riskiness of the person 2 included in the group 3, from which the correlation information as described above is detected, as being a high value and may calculate the behavioral safety thereof as being a low value.

In a case where the behavior monitoring device 10 detects that the person 2 is continuously looking at another person 2 for a predetermined time as information relating to the face of the person 2, the behavior monitoring device 10 may detect the correlation information indicating that the person 2 in interested in the other person 2. The behavior monitoring device 10 may calculate the behavioral riskiness of the person 2 included in the group 3, from which the correlation information as described above is detected, as being a high value and may calculate the behavioral safety thereof as being a low value.

In a case where there is no other person 2 present within a predetermined area from the person 2, the behavior monitoring device 10 may detect that the person 2 is not included in the group 3. In this case, the behavior monitoring device 10 cannot detect the correlation information of the group 3 including the person 2. The behavior monitoring device 10 may detect that the person 2 is acting independently based on a fact that the correlation information of the group 3 including the person 2 cannot be detected. In a case where the person 2 acts independently, the behavior monitoring device 10 may calculate the behavioral riskiness of the person 2 as being a high value. Accordingly, it can be said that the behavior monitoring device 10 can monitor the behavior of the person 2 based on the correlation information in addition to the attribute information of the person 2 even in a case where the person 2 is not included in the group 3.

For example, in a case where the behavior monitoring device 10 detects, as the attribute information of the person 2, that the person 2 is an old person, the line of sight of the person 2 is not fixed, and the person 2 is acting independently, the behavior monitoring device 10 may detect that there is a high possibility that the person 2 is an aged wanderer. The behavior monitoring device 10 may calculate the behavioral riskiness of the person 2 described above as being a high value.

Example of Behavior Monitoring Method of which Targets are Various Behaviors

Figure 6:
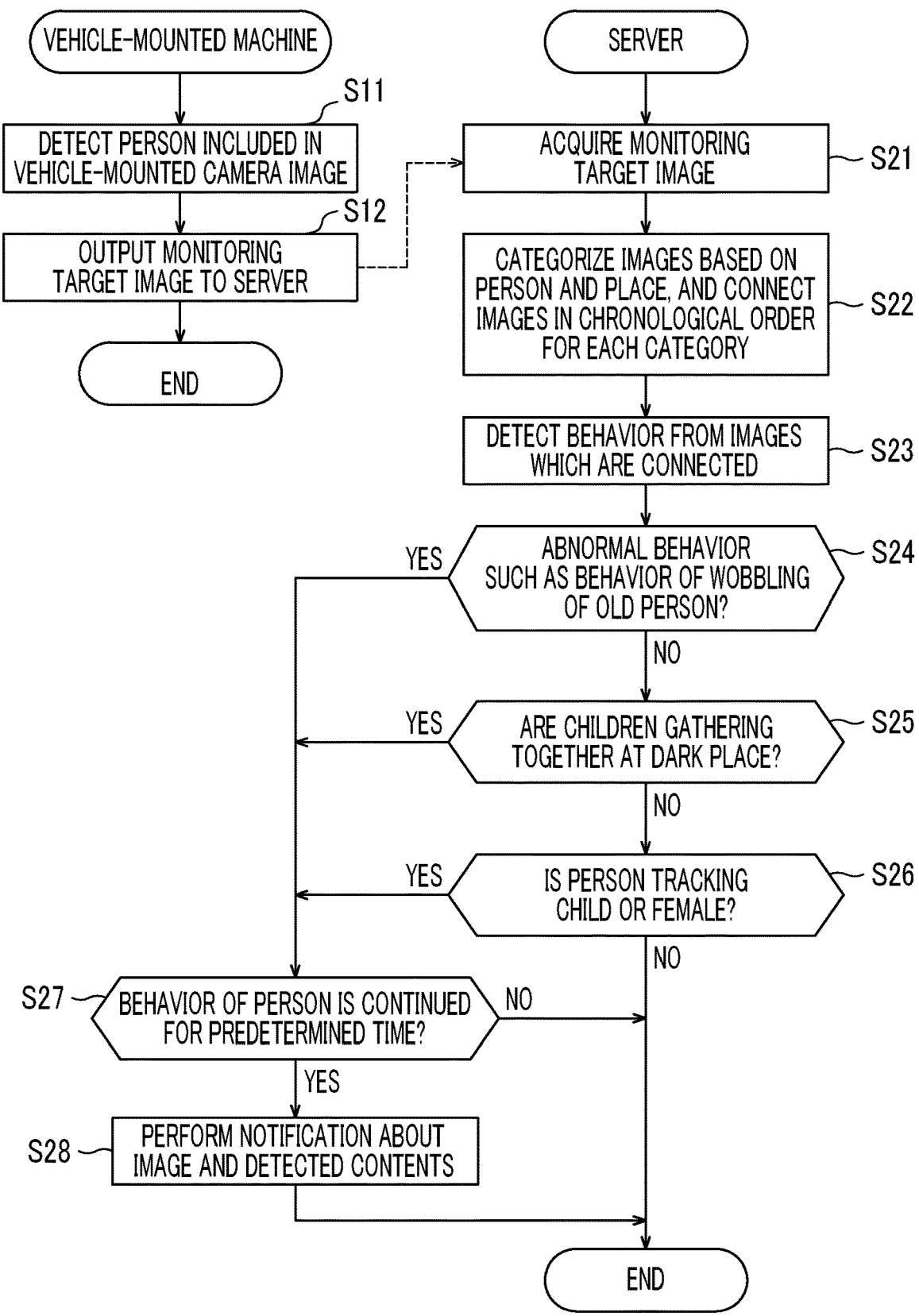
FIG. 6 is a flowchart illustrating another example of the processes in the behavior monitoring method.

The behavior monitoring system 100 provided with the vehicle 1 and the server 50 functioning as the behavior monitoring device 10 may perform a behavior monitoring method including processes as in a flowchart shown in FIG. 6. The vehicle-mounted camera 20, the position information acquisition device 25, the communication device 30, and the image analysis unit 40 installed in the vehicle 1 will be collectively referred to as vehicle-mounted machines.

The vehicle 1 detects the person 2 included in the vehicle-mounted camera image by using the vehicle-mounted machine (step S11).

The vehicle 1 outputs, as the monitoring target image, a moving image including the person 2 to the server 50 by using the vehicle-mounted machine (step S12). The vehicle 1 terminates the processes shown in the flowchart in FIG. 6 after performing the process in step S12.

The server 50 acquires the monitoring target image from the vehicle-mounted machine (step S21). The server 50 may acquire the monitoring target images from the vehicle-mounted machines of the vehicles 1.

The server 50 categorizes the acquired monitoring target images based on at least one of information relating to place where the acquired monitoring target images are captured and information relating to the person 2 included in the monitoring target images and connects the monitoring target images to each other in a chronological order for each category (step S22).

The server 50 detects the behavior of the person 2 from the monitoring target images, which are connected to each other for each category in step S22 (step S23). The server 50 may detect the attribute information of the person 2 from the monitoring target images. The server 50 may detect the correlation information of the group 3 including the person 2 from the monitoring target images.

The server 50 determines whether the behavior of the person 2 corresponds to an abnormal behavior such as a behavior of wobbling of an old person or not (step S24). That is, the server 50 may determine whether the behavior of the detected person 2 is abnormal as a sole behavior or not. The server 50 may determine whether various behaviors of the person 2 correspond to abnormal behaviors or not, the abnormal behaviors being not limited to a behavior of an old man. The abnormal behaviors are not limited to a behavior of wobbling of an old man and may include a behavior of being seated and a behavior of being lying down. In a case where the behavior of the detected person 2 corresponds to an abnormal behavior (YES in step S24), the server 50 proceeds to a process in step S27. In a case where the behavior of the detected person 2 does not correspond to an abnormal behavior (NO in step S24), the server 50 proceeds to a process in step S25.

The server 50 determines whether the behavior of the detected person 2 corresponds to a behavior of gathering together at a dark place of children or not (step S25). The server 50 may determine whether the person 2 is a child such as an elementary school student or not based on the attribute information of the person 2. The server 50 may determine whether a place where the person 2 is present is a dark place or not. The server 50 may calculate the number of persons 2 present within a predetermined area. In a case where the behavior of the detected person 2 corresponds to a behavior of gathering together at a dark place of children (YES in step S25), the server 50 proceeds to the process in step S27. In a case where the behavior of the detected person 2 does not correspond to a behavior of gathering together at a dark place of children (NO in step S25), the server 50 proceeds to a process in step S26.

The server 50 determines whether the behavior of the detected person 2 corresponds to a behavior of tracking a child or a female or not (step S26). The server 50 may determine whether the person 2 is tracking another person 2 or not based on the correlation information of the group 3 including the persons 2. The person 2 who is tracked is not limited to a child or a female and may be various types of persons 2. In a case where the behavior of the detected person 2 corresponds to a behavior of tracking a child or a female (YES in step S26), the server 50 proceeds to the process in step S27. In a case where the behavior of the detected person 2 does not correspond to a behavior of tracking a child or a female (NO in step S26), the server 50 terminates the processes shown in the flowchart in FIG. 6.

The server 50 determines whether the behavior of the person 2 detected in any of step S24 to step S26 has been continued for a predetermined time or not (step S27).

In a case where the behavior of the detected person 2 is continued for a predetermined time (YES in step S27), the server 50 performs notification about the monitoring target image from which the behavior has been detected and the contents of the detected behavior (step S28). The server 50 may perform the notification with respect to the terminal 70 or the vehicle 1.

In a case where the behavior of the detected person 2 is not continued for a predetermined time (NO in step S27), the server 50 terminates the processes shown in the flowchart in FIG. 6.

In the example shown in FIG. 6, the server 50 performs the processes in step S24 to step S26 sequentially. However, the server 50 may perform the processes in step S24 to step S26 in parallel and may perform the processes in step S24 to step S26 while changing the order of the processes.

Although it has been described above that the processes as in the flowchart shown in FIG. 6 are performed by the server 50 realizing the functions of the behavior monitoring device 10, the processes may be performed by the behavior monitoring device 10 installed in the vehicle 1.

The behavior monitoring device 10 can monitor various behaviors of the person 2 by performing the processes as in the flowchart shown in FIG. 6. As a result, the safety of an area may be improved.

Example of Registered Person Watching Operation

The monitoring target of the behavior monitoring system 100 may be the person 2 registered in advance. For example, a family of an old man or a facility staff, who protects the old man who possibly roams around, may register the old man in the behavior monitoring system 100 as the person 2 to be monitored. For example, a protector such as a parent of a child such as an infant or an elementary school student of which next behavior cannot be expected may register the child in the behavior monitoring system 100 as the person 2 to be monitored. For example, the person 2 registered in the behavior monitoring system 100 will be referred to as a registered person. A family of an old man, a facility staff, a protector of a child, or the like who registers the registered person in the behavior monitoring system 100 will be referred to as a monitoring requester.

The behavior monitoring system 100 may include a machine that acquires information about the position of the registered person. The following description will be made on an assumption that the monitoring requester causes the registered person to carry the machine. The following description will be made on an assumption that the monitoring requester carries the terminal 70.

In a case where the monitoring requester loses the location of the registered person, the monitoring requester causes the terminal 70 to output, to the behavior monitoring system 100, information requesting the monitoring of the behavior of the registered person. The behavior monitoring device 10 acquires information about the position of the registered person based on request information from the monitoring requester. The behavior monitoring device 10 transmits, to the vehicle 1 positioned within a predetermined area around the current position of the registered person, control information requesting that the vicinity of the current position of the registered person is imaged by the vehicle-mounted camera 20.

The vehicle 1 acquires the camera output information including an image of the vicinity of the current position of the registered person based on the control information and transmits the camera output information to the behavior monitoring device 10.

The behavior monitoring device 10 detects the monitoring target image including the person 2 from the camera output information acquired from the vehicle 1. The behavior monitoring device 10 detects the attribute information of the person 2 included in the monitoring target image and compares the attribute information with the attribute information of the registered person. The behavior monitoring device 10 detects the person 2, of which the attribute information coincides with the attribute information of the registered person, as the registered person. In a case where there are the persons 2 detected as the registered persons, the behavior monitoring device 10 transmits, to the terminal 70 of the monitoring requester, information requesting the terminal 70 to confirm which person 2 is the registered person. The monitoring requester causes the terminal 70 to transmit information designating the registered person from the persons 2 who are requested to be confirmed.

The behavior monitoring device 10 stores up the monitoring target images including the registered person in a chronological order. In a case where the behavior monitoring device 10 detects the correlation information of the group 3 including the registered person, the behavior monitoring device 10 monitors the behavior of the registered person based on the correlation information. The behavior monitoring device 10 may calculate the behavioral riskiness of the registered person. The behavior monitoring device 10 detects the behavior of the registered person and performs notification about detected information with respect to the terminal 70 of the monitoring requester. For example, in a case where the behavior monitoring device 10 detects the behavior of the registered person who is about to cross a road at a place with no traffic signal and no pedestrian crossing, the behavior monitoring device 10 performs notification about detected information with respect to the terminal 70 of the monitoring requester. The behavior monitoring device 10 may transmit the monitoring target image including the registered person to the terminal 70 of the monitoring requester. The monitoring requester can view information relating to the behavior of the registered person by using the terminal 70.

According to the present configuration example, the monitoring requester easily grasps an unexpected behavior of the registered person. As a result, the safety of a region is improved.

The embodiment of the present disclosure has been described based on the drawings and examples. However, it should be noted that various changes or modifications can be easily made by those skilled in the art based on the present disclosure. Accordingly, those changes or modifications should be construed as being included within the scope of the present disclosure. For example, the functions or the like included in each means or each step can be rearranged without logical inconsistency, and a plurality of means or steps can be combined with each other or be divided.

What is claimed is:

1. A behavior monitoring device comprising:
a controller configured to detect a behavior of a person included in a vehicle-mounted camera image, wherein:
the controller detects a plurality of persons from the vehicle-mounted camera image;
the controller detects attribute information of each of the detected persons and correlation information indicating a correlation between the detected persons;
the controller evaluates a behavior of each of the detected persons based on the attribute information and the correlation information, wherein the behavior is evaluated to be an abnormal behavior when one person among the detected persons (i) causes harm to another person among the detected persons or (ii) causes harm to oneself; and
the controller outputs a result of the evaluation and an instruction to a vehicle to travel in such a manner as to track the person evaluated to have the abnormal behavior.

2. The behavior monitoring device according to claim 1, wherein:
the controller further specifies at least one of a timing when the vehicle-mounted camera image from which the persons are detected is captured and a place where the vehicle-mounted camera image is captured; and the controller evaluates the behavior of each of the detected persons further based on at least one of the timing when the vehicle-mounted camera image is captured and the place where the vehicle-mounted camera image is captured.

3. The behavior monitoring device according to claim 1, wherein the controller outputs, as the result of the evaluation, a level of a risk to which the detected person is exposed.

4. The behavior monitoring device according to claim 1, wherein:
the controller acquires a first-timing image captured at a first timing and a second-timing image captured at a second timing from the vehicle-mounted camera image; and
the controller specifies a first person detected from both of the first-timing image and the second-timing image.

5. The behavior monitoring device according to claim 4, wherein the controller detects a level of a risk to which the first person is exposed based on a difference between attribute information of the first person at the first timing and attribute information of the first person at the second timing.

6. The behavior monitoring device according to claim 4, wherein the controller detects a level of a risk to which the first person is exposed based on a difference between correlation information of a plurality of persons including the first person at the first timing and correlation information of the persons including the first person at the second timing.

7. The behavior monitoring device according to claim 1, wherein:
the controller calculates a behavior evaluation value relating to the behavior of each of the detected persons; and
the controller determines that the behavior of each of the detected persons is any of: an abnormal behavior that increases a risk to a nearby person, a safety behavior that reduces the risk to the nearby person, and a normal behavior that does not increase or decrease a level of the risk to the nearby person based on the evaluation value.

8. A behavior monitoring system comprising:
a vehicle; and
a server located separately from the vehicle, the server including a behavior monitoring device, wherein:
the behavior monitoring device includes a controller configured to detect a behavior of a person included in a vehicle-mounted camera image of the vehicle;
the controller detects a plurality of persons from the vehicle-mounted camera image;
the controller detects attribute information of each of the detected persons and correlation information indicating a correlation between the detected persons;
the controller evaluates a behavior of each of the detected persons based on the attribute information and the correlation information, wherein the behavior is evaluated to be an abnormal behavior when one person among the detected persons (i) causes harm to another person among the detected persons or (ii) causes harm to oneself; and
the controller outputs a result of the evaluation to the vehicle and outputs an instruction for the vehicle to travel in such a manner as to track the person evaluated to have the abnormal behavior.

9. A behavior monitoring method executed by a processor programmed to perform:
a step of detecting a plurality of persons from a vehicle-mounted camera image;
a step of detecting attribute information of each of the detected persons and correlation information indicating a correlation between the detected persons;
a step of evaluating a behavior of each of the detected persons based on the attribute information and the correlation information, wherein the behavior is evaluated to be an abnormal behavior when, based on the attribute information and the correlation information, one person among the detected persons (i) causes harm to another person among the detected persons or (ii) causes harm to oneself; and
a step of outputting a result of the evaluation and an instruction to a vehicle to travel in such a manner as to track the person evaluated to have the abnormal behavior.

10. The behavior monitoring device according to claim 1, wherein: the attribute information includes movement information of the one person among the detected persons, and the correlation information includes a distance between the detected persons and an amount of time that the distance has continued between the detected persons.

11. The behavior monitoring device according to claim 1, wherein: two or more of the detected persons that exist within a predetermined area are determined to be in a group, and the attribute information and the correlation information is for each of the detected persons in the group.

* * * * *